US005878137A

United States Patent [19]

Ippolito et al.

[11] Patent Number: 5,878,137

[45] Date of Patent: Mar. 2, 1999

[54] METHOD FOR OBTAINING AUTHENTICITY IDENTIFICATION DEVICES FOR USING SERVICES IN GENERAL, AND DEVICE OBTAINED THEREBY

[75] Inventors: Giovanni Ippolito, Milan; Marco Giovanni Emilio Fortina, Borgomanero; Gianluca Colombo, Borgoticino, all of Italy

[73] Assignee: Alfi S.r.L., Borgoticino, Italy

[21] Appl. No.: 888,197

[22] Filed: Jul. 3, 1997

Related U.S. Application Data

[63] Continuation of Ser. No. 368,937, Jan. 5, 1995, abandoned.

[30] Foreign Application Priority Data

Jan. 11, 1994 [IT] Italy ................................ MI94A0022

[51] Int. Cl.$^{6}$ ................................ H04K 1/00; H04L 9/00

[52] U.S. Cl. ................................ 380/23; 380/25; 235/380; 340/825.34

[58] Field of Search ................................ 380/23–25; 340/825.34; 235/380

[56] References Cited

U.S. PATENT DOCUMENTS

| | | | |
|---|---|---|---|
| 4,023,012 | 5/1977 | Ano et al. | 235/379 |
| 4,034,211 | 7/1977 | Horst et al. | 235/454 |
| 4,476,468 | 10/1984 | Goldman | 340/825.34 |
| 4,734,568 | 3/1988 | Watanabe | 235/487 |
| 4,746,788 | 5/1988 | Kawana | 235/380 |
| 4,853,522 | 8/1989 | Ogasawara | 235/380 |
| 4,879,747 | 11/1989 | Leighton et al. | 380/23 |
| 4,910,774 | 3/1990 | Barakat | 380/23 |
| 5,120,939 | 6/1992 | Claus et al. | 235/382 |
| 5,249,230 | 9/1993 | Mihm, Jr. | 380/23 |
| 5,310,999 | 5/1994 | Claus et al. | 235/384 |
| 5,544,246 | 8/1996 | Mandelbaum et al. | 380/23 |
| 5,557,679 | 9/1996 | Julin et al. | 380/23 |
| 5,694,471 | 12/1997 | Chen et al. | 380/25 |

*Primary Examiner*—Gail O. Hayes
*Assistant Examiner*—Pinchus M. Laufer
*Attorney, Agent, or Firm*—Guido Modiano; Albert Josif

[57] ABSTRACT

Method for obtaining authenticity identification devices for using services in general wherein authenticity is guaranteed without resorting to the manufacturer of the device to ensure its validity; the method has the particularity that it consists in preparing an identification device with a read-only area and at least one writable area; the manufacturer of the device applies a first permanent and always different code to the read-only area. The service provider applies to the writable area a second code obtained by means of one-way functions that have a secret encryption key by computing the first permanent code. The identification device validated with the second code can be verified by means of a decryption key which may optionally be public.

10 Claims, 1 Drawing Sheet

METHOD FOR OBTAINING AUTHENTICITY IDENTIFICATION DEVICES FOR USING SERVICES IN GENERAL, AND DEVICE OBTAINED THEREBY

This is a continuation of application Ser. No. 08/368,937, filed on Jan. 5, 1995 now abandoned.

BACKGROUND OF THE INVENTION

The present invention relates to a method for obtaining authenticity identification devices for using services in general wherein authenticity is guaranteed without resorting to the manufacturer of the device to ensure its validity, and to the identification device thus obtained.

It is known that many identification devices are currently available and are manufactured according to the most disparate criteria, such as for example with a magnetic band, with variously shaped optical codes, with a microprocessor or with other systems; all have the particularity that their vulnerability to forgery is in practice inversely proportional to their cost.

The least vulnerable devices are characterized in that they resort to codes that can be programmed only by the manufacturer of said devices by means of equipment that is particularly expensive and is accordingly deemed to be not easily available to possible forgers.

However, this type of device has several drawbacks, the first whereof resides in the fact that one is totally dependent on the manufacturer of the device for generating valid devices.

Among these devices, the most widespread are constituted by the Watermark magnetic code, by various devices with read-only memory (ROM), and also comprise transponders, microprocessor cards, hologram-based codes, optical cards, and the like.

However, during the reading of devices of the above described type to verify their authenticity, it is necessary to link the permanent data of the manufacturer to those related to the service user by means of complex data processing or by direct connection to a remote data bank.

Another drawback of the above mentioned solutions is the fact that devices programmed directly by the manufacturer with secret unique codes must be guarded with many precautions during storage, since they are already intrinsically valid and can thus be used directly by any ill-intentioned person.

SUMMARY OF THE INVENTION

The principal aim of the invention is indeed to eliminate the drawbacks described above by providing a method for obtaining identification devices, as well as the identification devices themselves, which allow to guarantee the authenticity of the card by means of operations that can be performed directly by the service provider, maintaining and indeed increasing the intrinsic security of the card supplied by the manufacturer, thus allowing to provide devices that cannot be forged.

Within the scope of this aim, a particular object of the invention is to provide devices that can be stored without particular precautions, since prior to validation, which can be performed directly by the service provider, the device cannot be used since it is not recognized as valid by the reading device.

Another object of the present invention is to provide identification devices that can be customized by the service provider without having to resort to the manufacturer of the device and without having to resort to particular equipment or in any case to particularly complicated equipment.

Another object of the present invention is to provide a device that is impossible to forge even for the manufacturer of the device.

This aim, these objects, and others which will become apparent hereinafter are achieved by a method for obtaining authenticity identification devices for using services in general wherein authenticity is guaranteed without resorting to the manufacturer of the device to ensure its validity, according to the invention, as defined in the appended claims.

BRIEF DESCRIPTION OF THE DRAWINGS

Further characteristics and advantages will become apparent from the following detailed description of a preferred but not exclusive embodiment of a method for obtaining authenticity identification devices for using services in general wherein authenticity is guaranteed without resorting to the manufacturer of the device to ensure its validity, said method being illustrated only by way of non-limitative example in the accompanying drawings, wherein.

DESCRIPTION OF THE PREFERRED EMBODIMENTS

Figure 1:
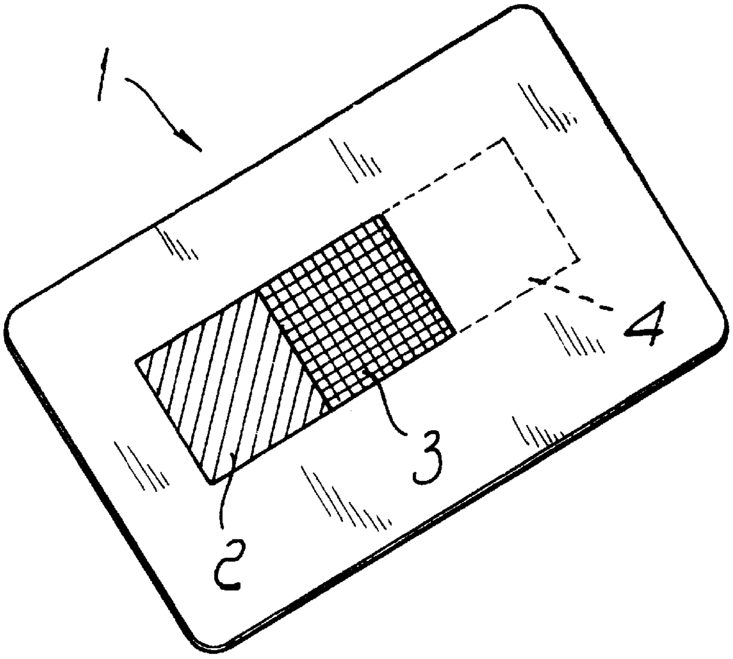
FIG. 1 is a schematic view of an identification device according to the present invention and FIG. 2 is a schematic view of the first and second codes written on different areas of the identification device.
Figure 2:
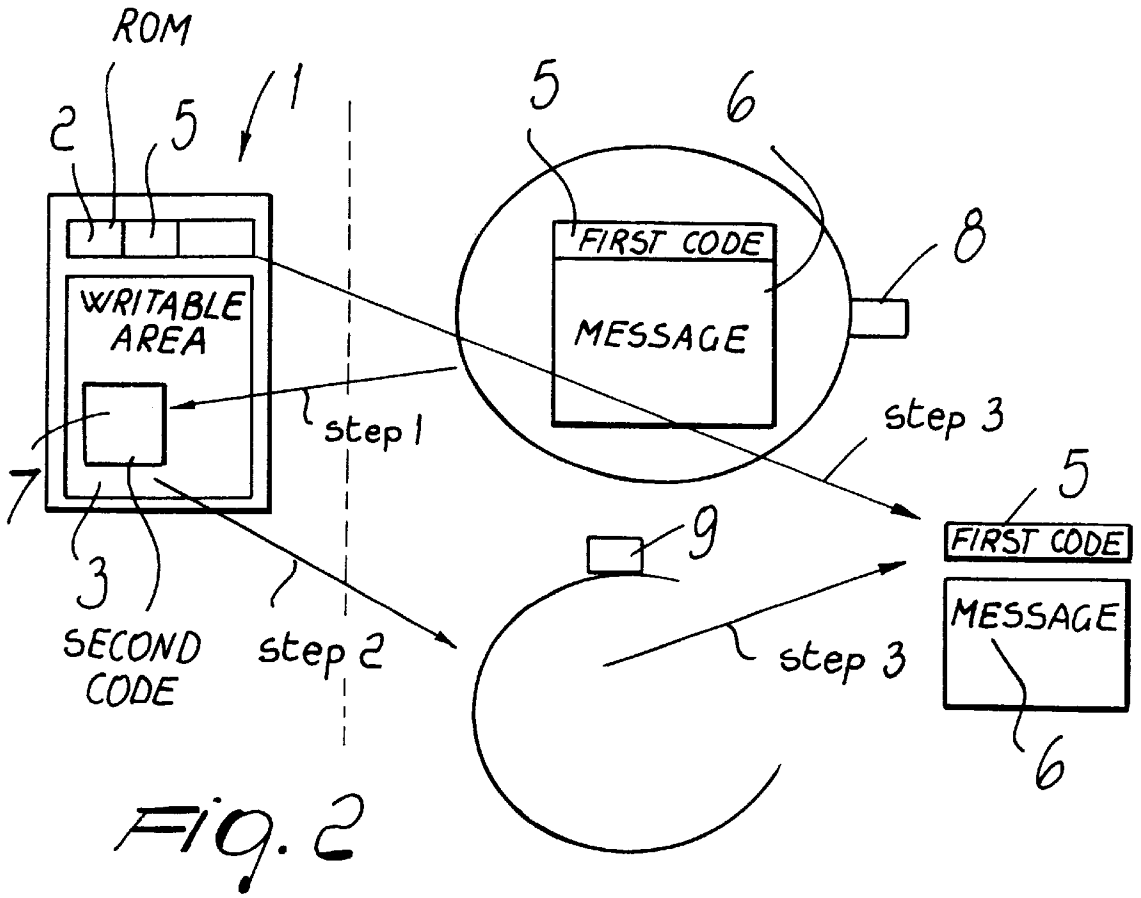

With reference to the above mentioned figures, the method for obtaining authenticity identification devices for using services in general wherein authenticity is guaranteed without resorting to the manufacturer of the device to ensure its validity consists in preparing an identification device or card 1, which can be of any kind and has a read-only area 2 and at least one writable area 3. Said area 3 is preferably but not necessarily of the write-once type. It is optionally possible to provide additional areas, designated by the reference numeral 4, on which it is possible to apply user security codes, for example by having the user himself enter identification codes, such as PINs, passwords, and so forth, or by means of an association with data that automatically identify the user, for example a photograph and a coded signature, biometric data such as a fingerprint, hand outline and so forth.

If one wishes to also guarantee the authenticity of the user security codes contained in the additional areas 4, said security codes must be written at the same time as the area 3. Said security codes can be encrypted with the same encryption key used for the area 3, and in this case the areas 4 may be of the write-once type or of the write-many type; it is also possible to write these messages in unencrypted form, and in this case the areas 4 must be of the write-once type.

A first permanent code 5 is provided directly by the manufacturer of the card on the area 2; said first code is always different and ensures that even at the outset no two cards are identical.

The particularity of the invention consists in applying (step 1) on the writable area 3 a second code 7 which is applied directly by the service provider and therefore not by the card manufacturer; said second code is computed by using one-way functions from the first permanent code and from a possible message 6, so as to produce, by means of a secret encryption key 8, the second code 7 which is linked in a non-identifiable way to the first permanent code, which is always different.

In this way the service provider directly validates the card by applying a code that in practice mutually associates the information present in the read-only area with any other information related to the supplier, to the service user, to the expiration date, to the type of service authorized, and so forth.

The second code 7 in practice provides an electronic signature that can be decrypted (step 2) by means of a decryption key 9 that can even be public.

In practice, decryption of the electronic signature must yield, as a result, an encrypted message which comprises, in a preset position, the first permanent code that unequivocally identifies the device (step 3); this guarantees the authenticity of the device and of the possible message. Furthermore it is assured the genuineness of the other data written on said device in a permanent manner simultaneously with the second code, with no need for additional verifications.

In practice, therefore, the authenticity of the device is guaranteed even without the need for an online connection to a centralized system.

The one-way system used may be one of the highly secure encryption systems that are already currently known, such as for example those that use discrete logarithms, block encryption or encipher, RSA encryption, and so forth.

Forgery is guaranteed to be impossible since it is not possible to manufacture a valid device starting from a virgin device unless one has the secret encryption key; accordingly, even the manufacturer of the device, that is to say whoever places the first permanent code, is unable to produce a valid document.

By virtue of the fact that the second code is applied when the device is used, the non-validated identification devices can be stored without particular precautions, since nobody except the service provider can generate the validation codes, that is to say, the second code.

Validated devices can be recognized by low-cost devices and the decryption key may even be public.

In a practical embodiment, a TIRIS transponder manufactured by Texas Instruments was used; said transponder has a first read-only area which is directly pre-programmed by the manufacturer with sequential numbers that are never identical and has a writable area, optionally of the write-once type.

First an apparatus constituted by a personal computer connected by a serial line to an apparatus for reading/writing the TIRIS transponder was manufactured and a software program capable of encrypting TIRIS transponders with an RSA algorithm and an appropriate encryption key was installed; the result of the computing obtained by encrypting the data written on the card directly by the manufacturer, that is to say, by Texas Instruments, was written on the second area, together with a message.

An apparatus similar to the preceding one was then produced, including a station for reading the devices by means of a software program capable of deciphering the second code which had been written on the second area by using the corresponding decryption key and comparing it with the code written by the manufacturer on the first area.

It was verified that none of the TIRIS transponders supplied by Texas Instruments and previously not validated was recognized as valid, whereas all the validated devices were recognized as valid.

A second code, copied from the second area of a valid TIRIS device, was also written onto a second area of other TIRIS; the reading of these documents recognized them as invalid.

From the above description it is thus evident that the invention achieves the intended aim and objects, and in particular the fact is stressed that a method is provided which allows to combine the intrinsic security characteristics of an identification device produced according to sophisticated security criteria with an additional degree of security arising from a second code that can be applied directly by the service provider by using the first code already applied to the card by the manufacturer.

The invention thus conceived is susceptible of numerous modifications and variations, all of which are within the scope of the inventive concept.

All the details may furthermore be replaced with other technically equivalent elements.

In practice, the materials employed, so long as they are compatible with the specific use, as well as the contingent shapes and dimensions, may be any according to the requirements.

What is claimed is:

1. A method for obtaining authenticity indentification devices usable for services in general wherein authenticity is guaranteed without resorting to a manufacturer of the device to ensure its validity, said method comprising the steps of:

using an identification device provided with only one read-only area which is writable only at the manufacturing time, and at least one writable area, said one read only area and said at least one writable area being freely externally readable by an external device, a first permanent and unique code being applied to said read-only area by the manufacturer of the identification device at the manufacturing time, said first permanent and unique code being freely externally readable;

having a service provider apply to said at least one writable area a second code, said second code being obtained by computing, by means of an encryption function having a secret encryption key, the joining in predetermined positions of said first permanent unique code and of a message, said second code being freely externally readable;

said identification device being externally validated through decryption of said second code by means of a decryption key, a portion of said decrypted second code arranged in a predetermined position being compared with said first permanent and unique code to verify the authenticity of the identification device and of the message applied to said at least one writable area.

2. A method according to claim 1, wherein said decryption key is a public key.

3. A method according to claim 1, wherein user security codes are applied to additional writable areas by the service provider at the same time as said second code is applied, said additional writable areas being freely externally readable.

4. A method according to claim 3, wherein said user security codes are obtained with the same encryption function used for said second code.

5. A method according to claim 3, wherein said additional areas are writable only one time.

6. A method according to claim 3, wherein said security codes are written in unencrypted form on said additional areas.

7. A method according to claim 1, wherein said second code is linked in a non-identifiable way to said first permanent and unique code by means of said encryption function.

8. A method according to claim 1, wherein said at least one writable area is an area writable only one time.

9. A method according to claim 1, wherein said encryption function is a RSA function.

10. An authenticity identification device, comprising a card having a read-only area predefined at the manufacturing time and at least one writable area, a first permanent and unique code being placed in said read-only area by the manufacturer of the card, and a second code being placed in said at least one writable area, said second code being obtained by computing said first permanent and unique code and a message by means of an encryption function that uses a secret encryption key, said second code being linked to said first code in an unidentifiable way by means of said secret encryption key, said second code being formed by said first code arranged in a predetermined position and by said message appended thereto.

* * * * *